United States Patent
Liu et al.

(10) Patent No.: US 11,470,043 B2
(45) Date of Patent: *Oct. 11, 2022

(54) ANTI-CRACKING METHOD AND SYSTEM FOR A CLOUD HOST, AS WELL AS TERMINAL DEVICE

(71) Applicant: Beijing Baidu Netcom Science and Technology Co., Ltd., Beijing (CN)

(72) Inventors: Chang Liu, Beijing (CN); Shaoyan Wang, Beijing (CN); Li Mi, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 24 days.

This patent is subject to a terminal disclaimer.

(21) Appl. No.: 17/165,737

(22) Filed: Feb. 2, 2021

(65) Prior Publication Data

US 2021/0160216 A1   May 27, 2021

Related U.S. Application Data

(63) Continuation of application No. 16/129,778, filed on Sep. 12, 2018, now Pat. No. 10,944,718.

(30) Foreign Application Priority Data

Dec. 8, 2017   (CN) .......................... 201711296214.8

(51) Int. Cl.
*H04L 9/40* (2022.01)
(52) U.S. Cl.
CPC ...... *H04L 63/0236* (2013.01); *H04L 63/0263* (2013.01); *H04L 63/1416* (2013.01);
(Continued)

(58) Field of Classification Search
CPC ............. H04L 63/0236; H04L 63/0263; H04L 63/1416; H04L 63/1425; H04L 63/1441; H04L 63/108

See application file for complete search history.

(56) References Cited

U.S. PATENT DOCUMENTS

| | | | | |
|---|---|---|---|---|
| 2009/0063371 A1* | 3/2009 | Lin | ........................ | H04L 63/126 706/47 |
| 2015/0319185 A1* | 11/2015 | Kirti | ..................... | H04L 67/306 726/23 |

(Continued)

FOREIGN PATENT DOCUMENTS

| | | |
|---|---|---|
| CN | 101123492 A | 2/2008 |
| CN | 101494639 A | 7/2009 |

(Continued)

OTHER PUBLICATIONS

First Chinese Office Action dated Aug. 27, 2018, for corresponding Chinese Application No. 2017112962148.

(Continued)

*Primary Examiner* — Ayoub Alata
(74) *Attorney, Agent, or Firm* — Kinney & Lange, P.A.

(57) ABSTRACT

An anti-cracking method and system for a cloud host, as well as a terminal device are provided according to the disclosure. The method includes: obtaining system logs of the cloud host; determining an IP which fails to log in the cloud host according to the system logs as a suspicious IP; tracking and determining the suspicious IP to be an attacker IP according to the number of times of consecutive login failure of the suspicious IP; and adding a first blocking rule to firewall settings of the cloud host; wherein the first blocking rule instructs to block a login operation of the attacker IP during a first preset blocking time. With the anti-cracking method for a cloud host of the disclosure, the (Continued)

brute-force cracking can be prevented proactively in a timely manner with only very few system resources occupied.

15 Claims, 9 Drawing Sheets

(52) U.S. Cl.
CPC ...... *H04L 63/1425* (2013.01); *H04L 63/1441* (2013.01); *H04L 63/108* (2013.01)

(56) References Cited

U.S. PATENT DOCUMENTS

2016/0134658 A1* 5/2016 Akiyama ............. H04L 63/145
726/23
2017/0201543 A1* 7/2017 Terry ................. H04L 63/1425

FOREIGN PATENT DOCUMENTS

| CN | 102957706 A | 3/2013 |
| CN | 105704146 A | 6/2016 |
| CN | 106161395 A | 11/2016 |
| CN | 106686014 A | 5/2017 |
| CN | 107070940 A | 8/2017 |

OTHER PUBLICATIONS

Second Chinese Office Action dated Sep. 20, 2018, for corresponding Chinese Application No. 2017112962148.

* cited by examiner

US 11,470,043 B2

ANTI-CRACKING METHOD AND SYSTEM FOR A CLOUD HOST, AS WELL AS TERMINAL DEVICE

CROSS-REFERENCE TO RELATED APPLICATIONS

The present application is a continuation of U.S. patent application Ser. No. 16/129,778, filed on Sep. 12, 2018, and entitled "Anti-Cracking Method and System for a Cloud Host, as well as Terminal Device", which claims the benefit of priority to Chinese Patent Application No. 201711296214.8, filed on Dec. 8, 2017, and entitled "Anti-Cracking Method and System for a Cloud Host, as well as Terminal Device", both of which are incorporated in the present application by reference in their entireties.

TECHNICAL FIELD

The disclosure relates to the field of computer processing technology, and in particular to an anti-cracking method and system for a cloud host, as well as a terminal device.

BACKGROUND

There are a huge number of cloud hosts in a cloud computing system. These cloud hosts are newly developed products as compared to the traditional physical hosts. Therefore, there is a shortage of a systematic security management system for a cloud host and thus the cloud host is vulnerable to an attack from hacker. The most common manner of attack is brute-force cracking, in which a hacker attempts to log in a cloud host by entering a password again and again using software until logging in the cloud host successfully. Once logged in the cloud host successfully, the hacker may damage the cloud host, or may also use a large number of cloud hosts together to launch an attack outward, thereby causing a great damage.

An attack by brute-force cracking typically is characterized in that: an internetwork protocol (IP) address attempts to log in a cloud host for multiple times, and it fails to log in for multiple times consecutively. Currently, most operating systems, such as a Windows system and a Linux system, can record the corresponding logs of login failure. A user can check these logs on his/her own initiative to determine which IP is a suspicious IP, and then set a firewall rule to block a login request from the corresponding IP address.

However, in the above method, a high professional ability of the user is required, and it is not suitable for being applied as a general solution.

SUMMARY

An anti-cracking method and system for a cloud host, as well as a processing device, are provided according to embodiments of the disclosure, with the purpose of solving or alleviating one or more technical problems in the related art and at least providing an advantageous option.

In a first aspect, an anti-cracking method for a cloud host is provided according to an embodiment of the disclosure, which includes:

obtaining system logs of the cloud host;

determining an IP which fails to log in the cloud host according to the system logs as a suspicious IP;

tracking the suspicious IP and determining the suspicious IP to be an attacker IP according to the number of times of consecutive login failure of the suspicious IP; and adding a first blocking rule to firewall settings of the cloud host; wherein the first blocking rule instructs to block a login operation of the attacker IP during a preset blocking time, the preset blocking time being a first preset blocking time.

In conjunction with the first aspect, in a first embodiment of the first aspect of the present disclosure, the method further includes:

setting a threshold for the number of times of consecutive login failure of the suspicious IP; and the determining the suspicious IP to be an attacker IP according to the number of times of consecutive login failure of the suspicious IP comprises:

determining the suspicious IP to be an attacker IP in a case that the number of times of consecutive login failure of the suspicious IP exceeds the threshold.

In conjunction with the first aspect, in a second embodiment of the first aspect of the present disclosure, the method further includes: deleting the first blocking rule from the firewall settings after the preset blocking time elapses so as to unblock the login operation of the attacker IP, and adding the attacker IP to a watch list.

In conjunction with the second embodiment of the first aspect, the method further includes:

tracking an operation of the attacker IP in the watch list through the system logs; and in a case that the attacker IP in the watch list fails to log in the cloud host again, adding a second blocking rule to the firewall settings; wherein the second blocking rule instructs to block the login operation of the attacker IP during a second preset blocking time as the preset blocking time.

Preferably, the second preset blocking time is twice the first preset blocking time or more.

In conjunction with the second embodiment of the first aspect, the method further includes: sending an alarm signal to the cloud, in a case that the attacker IP in the watch list logs in the cloud host successfully.

In a second aspect, an anti-cracking system for a cloud host is provided according to an embodiment of the disclosure, which includes:

a log obtaining unit, configured for obtaining system logs of the cloud host;

an suspicious IP determining unit, configured for determining an IP which fails to log in the cloud host according to the system logs as a suspicious IP;

an attacker IP determining unit, configured for determining the suspicious IP to be an attacker IP according to the number of times of consecutive login failure of the suspicious IP; and a first blocking unit, configured for adding a first blocking rule to firewall settings of the cloud host; wherein the first blocking rule instructs to block a login operation of the attacker IP during a preset blocking time, the preset blocking time being a first preset blocking time.

In conjunction with the second aspect, in a first embodiment of the second aspect of the present disclosure, the attacker IP determining unit is further configured for:

setting a threshold for the number of times of consecutive login failure of the suspicious IP; and tracking and determining the suspicious IP to be an attacker IP in a case that the number of times of consecutive login failure of the suspicious IP exceeds the threshold.

In conjunction with the second aspect, in a second embodiment of the second aspect of the disclosure, the system further includes:

an attacker IP unblocking unit, configured for deleting the first blocking rule from the firewall settings after the preset blocking time elapses so as to unblock the login operation of the attacker IP, and adding the attacker IP to a watch list.

In conjunction with the second embodiment of the second aspect, the system further includes:

an attacker IP tracking unit, configured for tracking an operation of the attacker IP in the watch list through the system logs; and a second blocking unit, configured for, in a case that the attacker IP in the watch list fails to log in the cloud host again, instructing the first blocking unit to add a second blocking rule to the firewall settings; wherein the second blocking rule instructs to block the login operation of the attacker IP during a second preset blocking time as the preset blocking time.

Preferably, the second preset blocking time is twice the first preset blocking time or more.

In conjunction with the second embodiment of the second aspect, the system further includes: an alarm signal sending unit, configured for sending an alarm signal to the cloud, in a case that the attacker IP in the watch list logs in the cloud host successfully.

In a third aspect, a terminal device is provided according to an embodiment of the disclosure, and the device includes:

one or more processors;

a memory, configured for storing one or more programs; and a communication interface, configured for allowing the memory and the processors to communicate with an external device;

wherein when the one or more programs are executed by the one or more processors, the one or more processors are caused to implement the method according to any of the above described.

The functions may be implemented by hardware, or may also be implemented by executing corresponding software using hardware.

One of the above-described technical solutions has the following advantages or advantageous effects: the brute-force cracking can be resisted proactively in a timely manner with only very few system resources being occupied.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Figure 1:
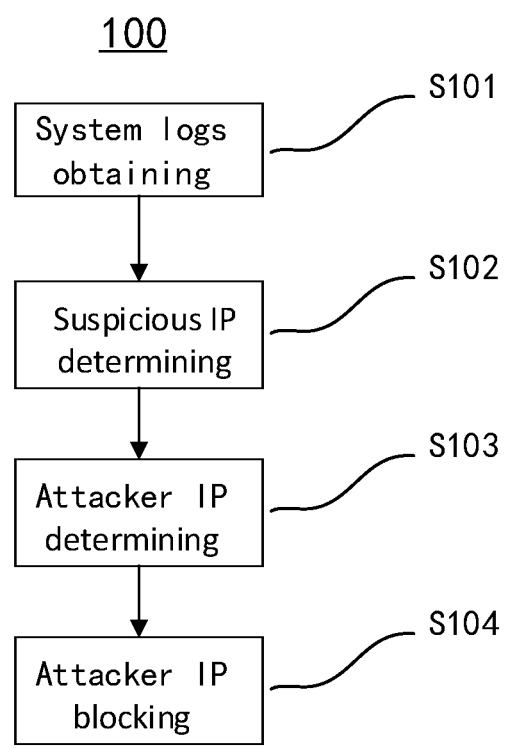
FIG. 1 shows a flowchart of an anti-cracking method 100 for a cloud host according to an embodiment of the present disclosure.

With reference to FIG. 1, in a first aspect of the disclosure, an anti-cracking method 100 for a cloud host is provided according to an embodiment of the disclosure.

The anti-cracking method 100 for a cloud host includes the following steps S101 to S104.

In step S101, obtaining the system logs of the cloud host.

In an embodiment, most of the operating systems applied in a cloud host provide a log recording function, and all the login events may be recorded in the system logs. In the embodiment, the system may be firstly initialized to ensure that a firewall is currently in a normal operation. Then the system logs are obtained.

In step S102, determining an IP which fails to log in the cloud host according to the system logs as a suspicious IP.

In an embodiment, an IP which fails to log in the cloud host is identified by analyzing the system logs, and this IP is marked as a suspicious IP.

In step S103, tracking the suspicious IP and determining the suspicious IP to be an attacker IP according to the number of times of consecutive login failure of the suspicious IP.

In an embodiment, for the suspicious IP, the first time when the suspicious IP fails to log in the cloud host is recorded. In a following time period, for example, 5 minutes, if this suspicious IP consecutively attempts to log in the cloud host and fails for each time, this IP is determined to perform an attack and be an attacker IP, and it is added to a blocking list.

More specifically, it is possible to set a threshold of the number of times of consecutive login failure, and to determine that the suspicious IP is an attacker IP if the number of times of consecutive login failure of the suspicious IP exceeds the threshold. For example, assuming that the threshold is set to be five, then in a case that the suspicious IP fails to log in the cloud host for five consecutive times, the suspicious IP is determined to be an attacker IP.

In step S104, adding a first blocking rule to firewall settings of the cloud host; wherein the first blocking rule instructs to block a login operation of the attacker IP during a first preset blocking time, the preset blocking time being a first preset blocking time.

In an embodiment, a firewall is provided in a typical operating system, for example, Iptables for the Linux system and a firewall for the Windows system. The attacker IP in the blocking list may be blocked by setting a first blocking rule in the firewall settings. Moreover, a first preset blocking time may be set, for example, to be 24 hours. During the first preset blocking time, a login operation of the attacker IP may be blocked according to the first blocking rule.

According to step S101 to step S104 of the anti-cracking method 100 for a cloud host, the cloud host is enabled to be proactive to an attack. Moreover, it is possible to flexibly modify the first blocking rule for an attacker IP by merely modifying the firewall settings, which not only occupies very few system resources, but also blocks an attack by brute-force cracking effectively. Also, the method is adapted to different scenarios.

Figure 2:
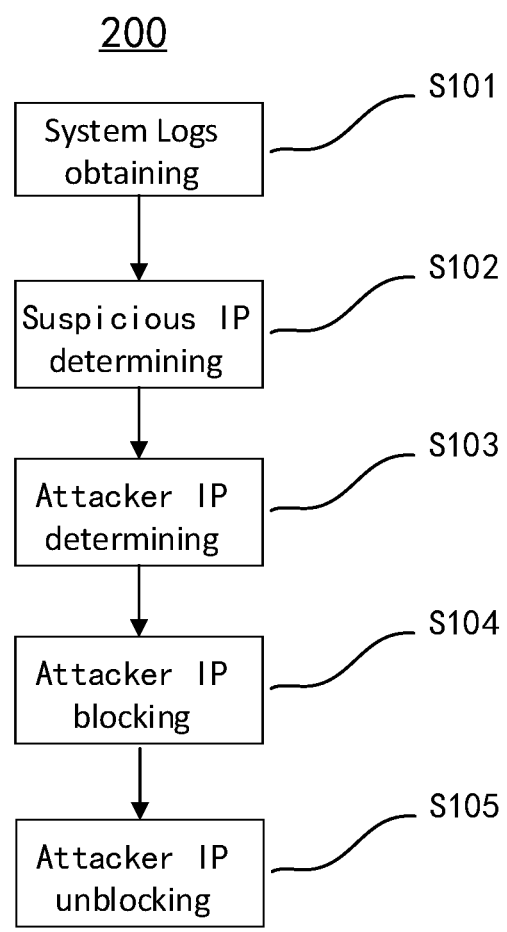
FIG. 2 shows a flowchart of an anti-cracking method 200 for a cloud host according to another embodiment of the present disclosure.

With reference to FIG. 2, an anti-cracking method 200 for a cloud host is provided according to another embodiment of the disclosure. As shown in FIG. 2, the method 200 differs from the method 100 in that it further includes a step S105.

In step S105, after the first preset blocking time elapses, deleting the first blocking rule from the firewall settings to unblock the login operation of the attacker IP, and adding the attacker IP to a watch list.

In an embodiment, after the first preset blocking time is over, the first blocking rule may be deleted from the firewall settings. In this way, the blocking to the attacker IP may be ended, and the attacker IP may be added to a watch list. Then, the attacker IP in the watch list may attempt to log in the cloud host again.

Figure 3:
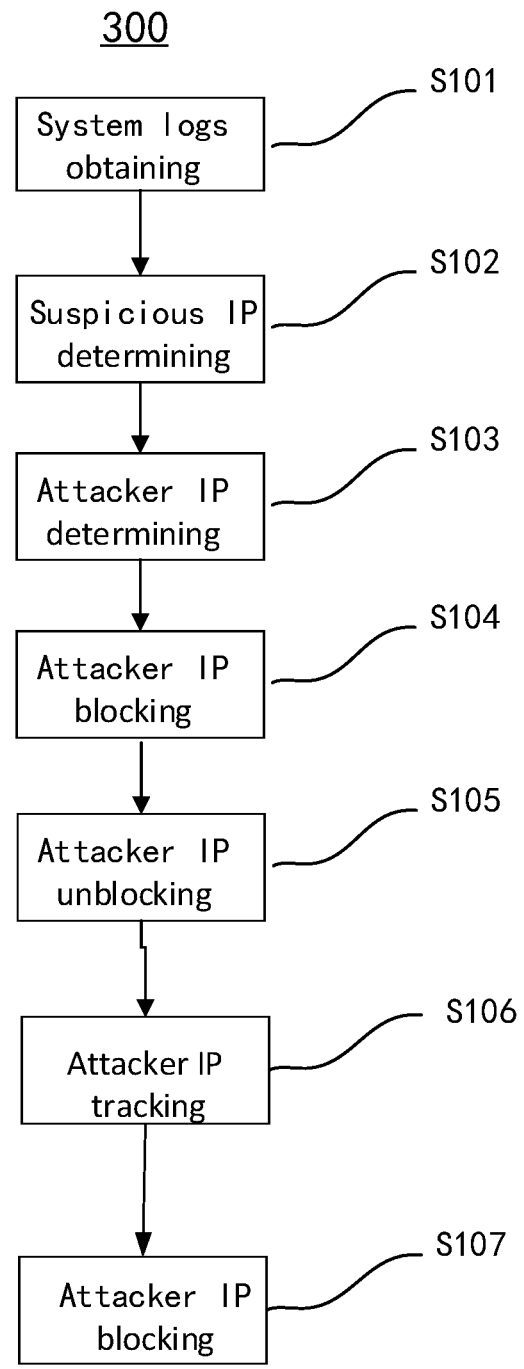
FIG. 3 shows a flowchart of an anti-cracking method 300 for a cloud host according to yet another embodiment of the present disclosure.

With reference to FIG. 3, an anti-cracking method 300 for a cloud host is provided according to yet another embodiment of the disclosure. As shown in FIG. 3, the method 300 differs from the method 200 in that it further includes steps S106 to S107.

In step S106, tracking an operation of the attacker IP in the watch list through the system logs.

In step S107, in a case that the attacker IP in the watch list fails to log in the cloud host again, adding a second blocking rule to the firewall settings; wherein the second blocking rule instructs to block the login operation of the attacker IP during a second preset blocking time as the preset blocking time.

In an embodiment, if the attacker IP in the watch list, namely the attacker IP for which the blocking is ended, fails to log in the cloud host again, the attacker IP may be blocked again. Then, step S107 is performed, that is to return to step S104 in which a second blocking rule is added to the firewall settings, wherein the second blocking rule instructs to block the login of the attacker IP during a second preset blocking time.

Preferably, by performing step S104, the attacker IP may be blocked again. Then, the second preset blocking time may be set to be twice the first preset blocking time, although the choice of the second blocking time is not limited thereto, and may be any selected time.

Figure 4:
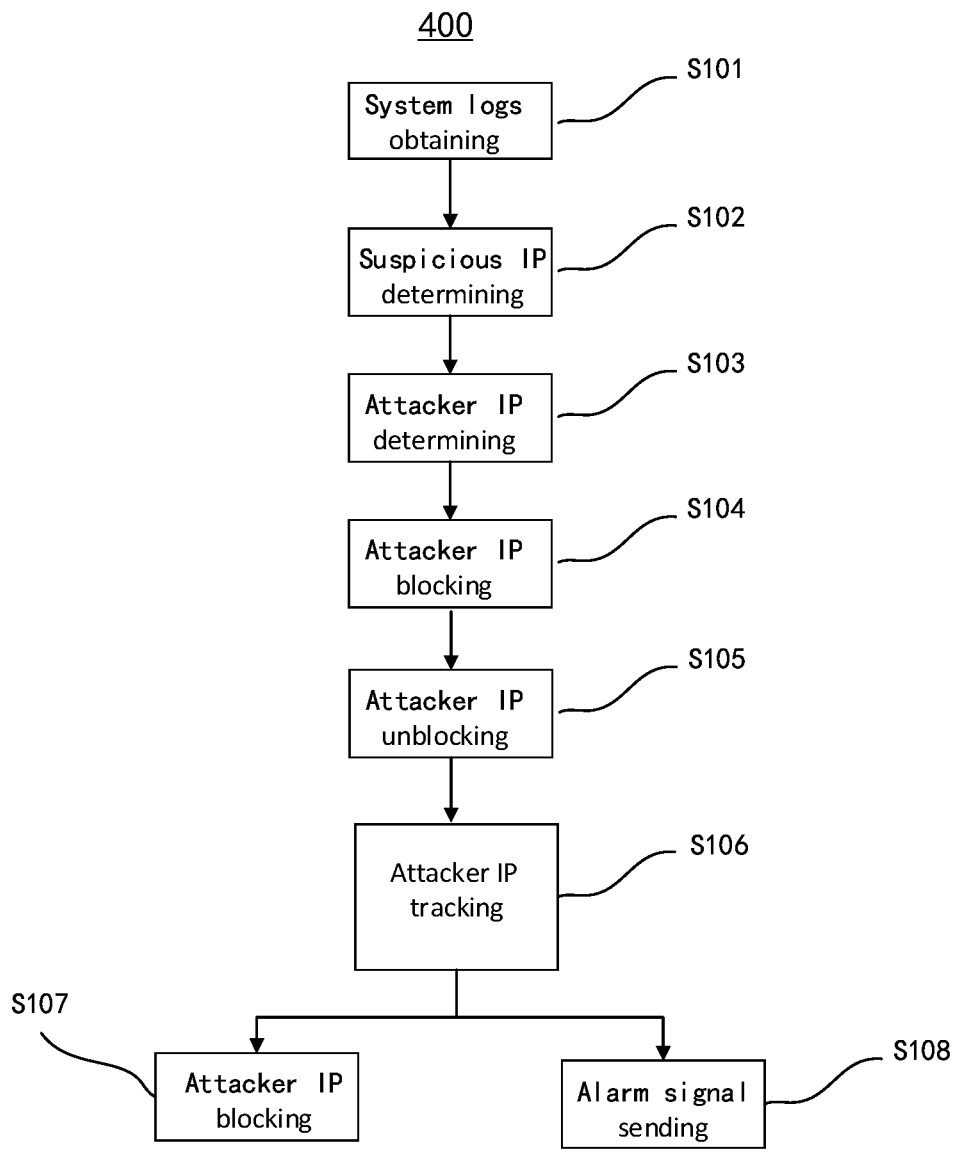
FIG. 4 shows a flowchart of an anti-cracking method 400 for a cloud host according to still further another embodiment of the present disclosure.

With reference to FIG. 4, an anti-cracking method 400 for a cloud host is provided according to still another embodiment of the disclosure. As shown in FIG. 4, the method 400 differs from the method 300 in that it further includes a step S108.

Step S108, sending an alarm signal to the cloud, in a case that the attacker IP in the watch list logs in the cloud host successfully.

In an embodiment, if the attacker IP in the watch list logs in the cloud host successfully, it may indicate that the user corresponding to the attacker IP logs in the cloud host successfully, or this user has cracked the password of the cloud host. In this case, an alarm signal may be sent to the cloud, and then provided to the user of the cloud host by the cloud. By sending the alarm signal, it is possible to prompt the user of the cloud host with respect to a risk effectively and in time, in a case that the cloud host was cracked, thus reducing the loss.

Figure 5:
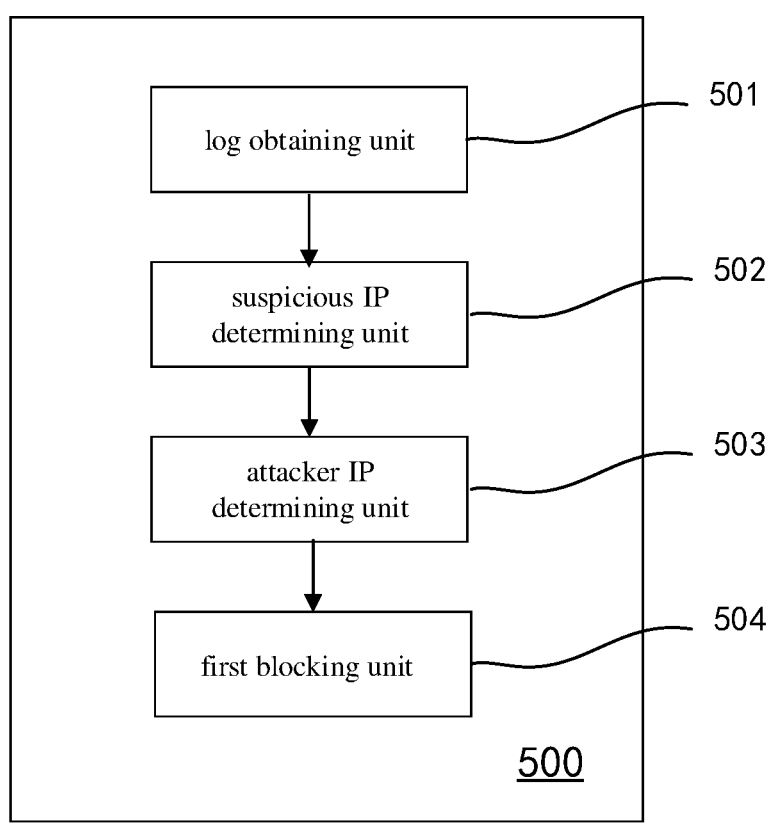
FIG. 5 shows a structural block diagram of an anti-cracking system 500 for a cloud host according to an embodiment of the present disclosure.

With reference to FIG. 5, in a second aspect of the disclosure, an anti-cracking system 500 for a cloud host is provided according to an embodiment of the disclosure, which includes: a log obtaining unit 501, a suspicious IP determining unit 502, an attacker IP determining unit 503, and a first blocking unit 504.

The log obtaining unit 501 is configured for obtaining system logs of the cloud host.

In an embodiment, most of the operating systems applied to the cloud host are provided with a log recording function, and all the login events may be recorded in the system logs. The system may be firstly initialized to ensure that the firewall is now in a normal operation, and the system logs of the cloud host are obtained.

The suspicious IP determining unit 502 is configured for determining an IP which fails to log in the cloud host according to the system logs as a suspicious IP.

In an embodiment, after the system logs are obtained, an IP which fails to log in the cloud host may be identified, and this IP may be determined as a suspicious IP.

The attacker IP determining unit 503 is configured for tracking and determining the suspicious IP to be an attacker IP according to the number of times of consecutive login failure of the suspicious IP.

In an embodiment, for the suspicious IP, the attacker IP determining unit may record the time when the suspicious IP fails to log in the cloud host for the first time. In a following time period, for example, 5 minutes, if this suspicious IP consecutively attempts to log in the cloud host and fails for each time, it is determined that this IP is performing an attack, may be determined to be an attacker IP, and is placed into a blocking list.

More specifically, a threshold of the number of times of consecutive login failure may be set, and the attacker IP determining unit determines that the suspicious IP is an attacker IP in a case that the number of times of consecutive login failure of the suspicious IP exceeds the threshold. For example, assuming that the threshold is set to be five, in a case that the suspicious IP fails to log in the cloud host for five consecutive times, the suspicious IP may be determined to be an attacker IP.

The first blocking unit 504 is configured for adding a first blocking rule to firewall settings of the cloud host; wherein the first blocking rule instructs to block a login operation of the attacker IP during a preset blocking time, the preset blocking time being a first preset blocking time.

In an embodiment, the first blocking unit may be configured to set the first blocking rule to block the attacker IP. Moreover, the first preset blocking time may be set, for example, 24 hours. During the first preset blocking time, the blocking rule may instruct to block the login operation of the attacker IP.

According to the anti-cracking system 500 for a cloud host described above, the cloud host has a proactive capability, and can flexibly modify the first blocking rule for blocking the attacker IP by merely modifying the firewall settings, which not only occupies very few system resources, but also blocks an attack by brute-force cracking effectively. In addition, the system is adapted to different scenarios.

Figure 6:
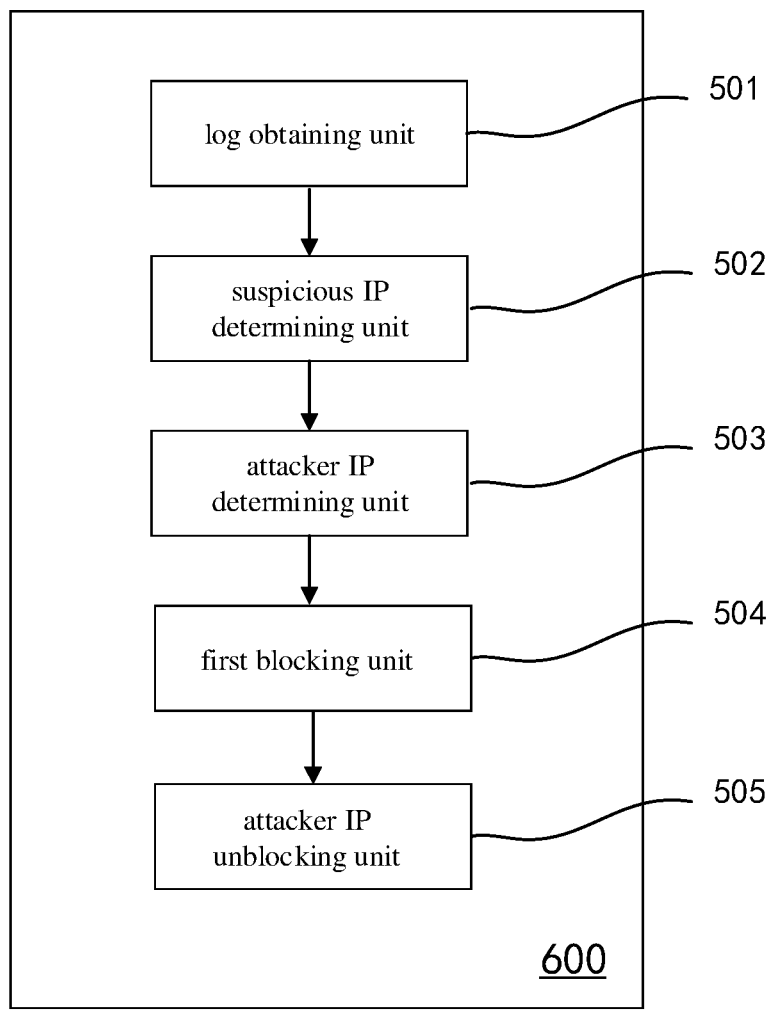
FIG. 6 shows a structural block diagram of an anti-cracking system 600 for a cloud host according to another embodiment of the present disclosure.

With reference to FIG. 6, in the second aspect of the disclosure, an anti-cracking system 600 for a cloud host is provided according to another embodiment of the disclosure, which includes: a log obtaining unit 501, a suspicious IP determining unit 502, an attacker IP determining unit 503, a first blocking unit 504 and an attacker IP unblocking unit 505.

The functions and implementations of the log obtaining unit 501, the suspicious IP determining unit 502, the attacker IP determining unit 503, and the first blocking unit 504 are described above, and therefore will not be repeated any more.

The attacker IP unblocking unit 505 is configured for deleting the first blocking rule from the firewall settings after the preset blocking time elapses so as to unblock the login operation of the attacker IP, and adding the attacker IP to a watch list.

In an embodiment, after the blocking time elapse, the attacker IP unblocking unit may delete the blocking rule from the firewall settings. In this way, the blocking of the attacker IP is ended by the unblocking unit, and the unblocked attacker IP is added to the watch list. Then, the attacker IP in the watch list may attempt to log in the cloud host again.

Figure 7:
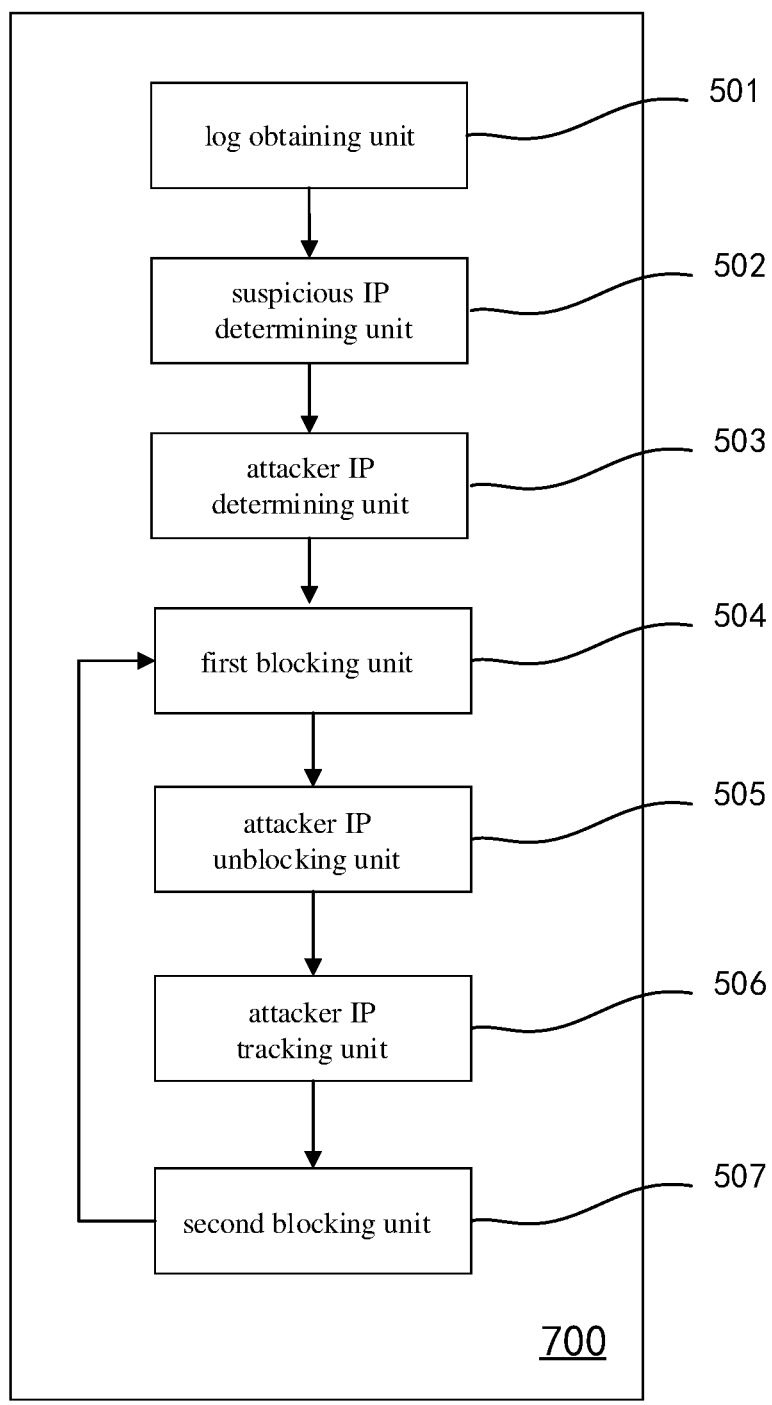
FIG. 7 shows a structural block diagram of an anti-cracking system 700 for a cloud host according to further another embodiment of the present disclosure.

With reference to FIG. 7, in the second aspect of the disclosure, an anti-cracking system 700 for a cloud host is provided according to further another embodiment of the disclosure, which includes: a log obtaining unit 501, a suspicious IP determining unit 502, an attacker IP determining unit 503, a first blocking unit 504, an attacker IP unblocking unit 505, an attacker IP tracking unit 506 and a second blocking unit 507.

The functions and implementations of the log obtaining unit 501, the suspicious IP determining unit 502, the attacker IP determining unit 503, the first blocking unit 504 and the attacker IP unblocking unit 505 are described above, and therefore will not be repeated any more.

The attacker IP tracking unit 506 is configured for tracking an operation of the attacker IP in the watch list through the system logs.

The second blocking unit 507 is configured for, in a case that the attacker IP in the watch list fails to log in the cloud host again, instructing the first blocking unit to add a second blocking rule to the firewall settings; wherein the second blocking rule instructs to block the login operation of the attacker IP during a second preset blocking time.

In an embodiment, if the attacker IP in the watch list, namely the unblocked attacker IP, fails to log in the cloud host again, the attacker IP will be blocked again. Then, the second blocking unit may add a second blocking rule in the firewall settings, wherein the second blocking rule instructs to block the login operation of the attacker IP during a second preset blocking time.

Preferably, the second preset blocking time may be set to be twice the first preset blocking time or more.

Figure 8:
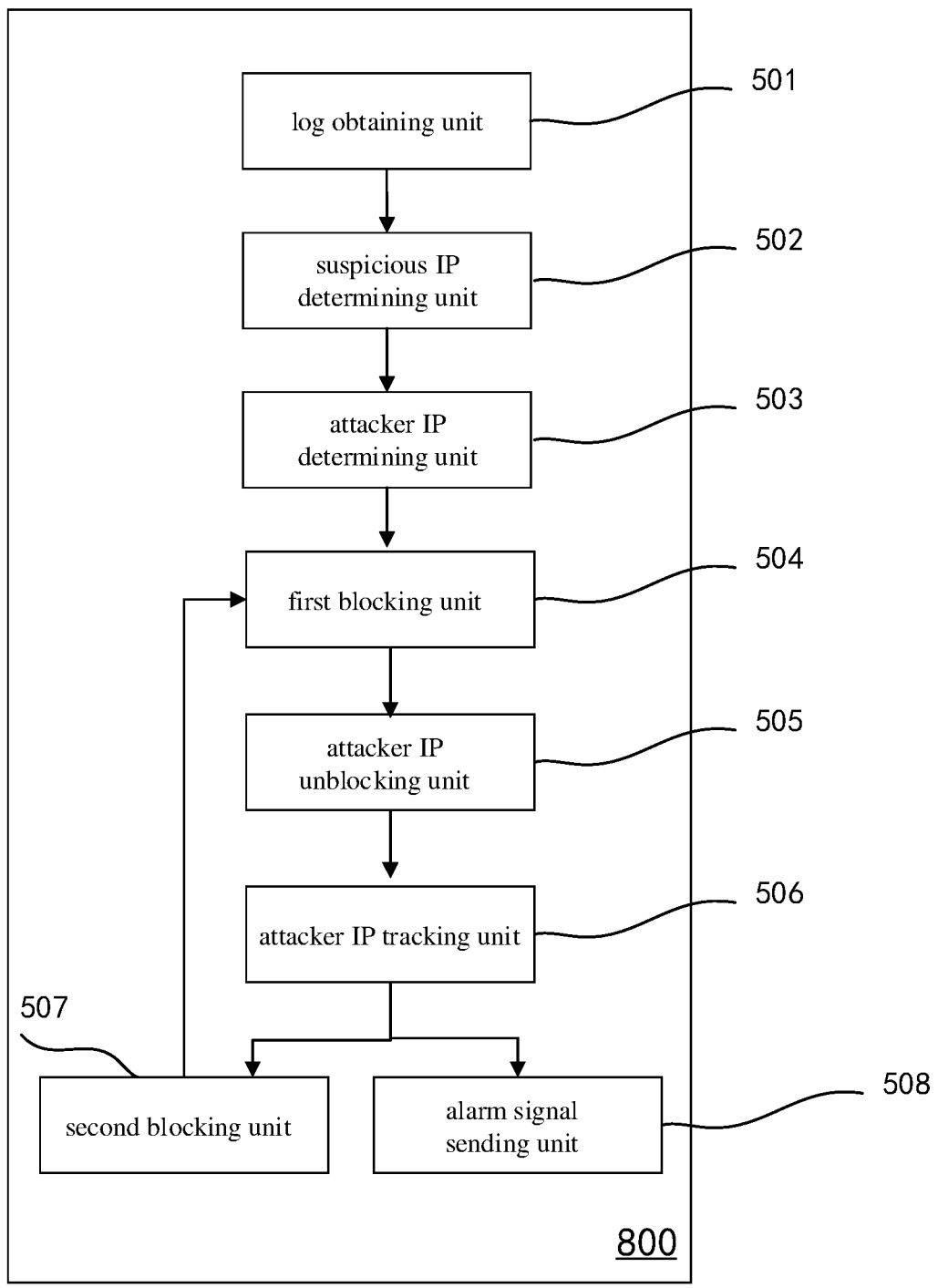
FIG. 8 shows a structural block diagram of an anti-cracking system 800 for a cloud host according to still further another embodiment of the present disclosure.

With reference to FIG. 8, in the second aspect of the disclosure, an anti-cracking system 800 for a cloud host is provided according to still further another embodiment of the disclosure, which includes: a log obtaining unit 501, a suspicious IP determining unit 502, an attacker IP determining unit 503, a first blocking unit 504, an attacker IP unblocking unit 505, an attacker IP tracking unit 506, a second block unit 507 and an alarm signal sending unit 508.

The functions and implementations of the log obtaining unit 501, the suspicious IP determining unit 502, the attacker IP determining unit 503, the first blocking unit 504, the attacker IP unblocking unit 505, the attacker IP tracking unit 506, and the second unit 507 are described above, and therefore will not be repeated any more.

The alarm signal sending unit 508 is configured for sending an alarm signal to the cloud, in a case that the attacker IP in the watch list logs in the cloud host successfully.

In an embodiment, specifically, if the unblocked attacker IP logs in the cloud host successfully, it may indicate that the user corresponding to the attacker logs in the cloud host successfully, or this user has cracked the password of the cloud host. In this case, the alarm signal sending unit sends the alarm signal to the cloud, and the cloud provides the user of the cloud host with the alarm signal. The alarm signal sending unit can effectively prompt the user of the cloud host with respect to the risk, in a case that the cloud host was cracked, thus reducing the loss.

Figure 9:
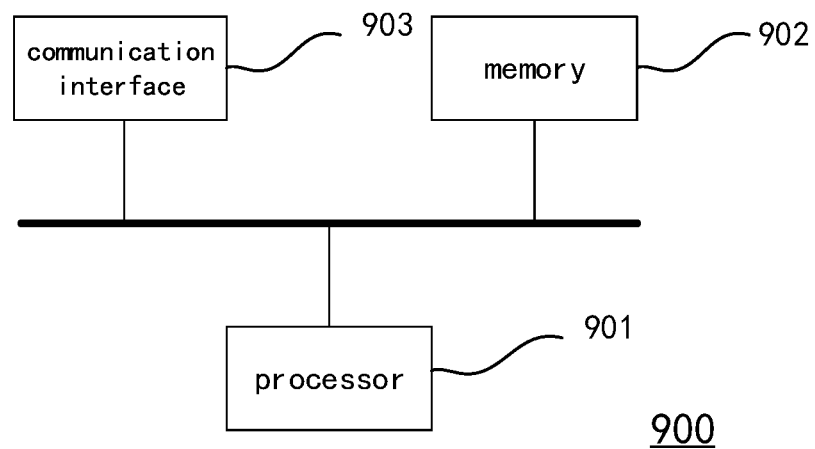
FIG. 9 shows a schematic diagram of a terminal device 900 according to the present disclosure.

With reference to FIG. 9, in a third aspect of the disclosure, a terminal device 900 is provided according to an embodiment of the disclosure. The terminal device includes: one or more processors 901; and a memory 902, configured for storing one or more programs. When the one or more programs are executed by the one or more processors, the one or more processors are instructed to implement any of the methods 100 to 400 as described above.

The numbers of the memory 902 and the processor 901 each may be one or more.

The device further includes:

a communication interface 903, configured for allowing the memory and the processor to communicate with an external device.

The memory may include a high-speed RAM memory, or may also include a non-volatile memory, such as at least one disk memory.

If the memory, the processor and the communication interface are implemented independently, the memory, the processor and the communication interface may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 9 to represent the bus, but it does not mean that there is only one bus or only one type of bus.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logic and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device. More specific examples (non-exhaustive list) of computer-readable medium include: electrical connection parts (electronic devices) having one or more wires, portable computer disk cartridges (magnetic devices), random access memory (RAM), read only memory (ROM), erasable programmable read only memory (EPROM or flash memory), fiber optic devices, and portable read only memory (CDROM). In addition, the computer-readable medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. An anti-cracking method for a cloud host which is implemented in the could host, the method comprising:
    determining an Internet Protocol address which fails to log in the cloud host according to system logs of the cloud host as a suspicious Internet Protocol address;
    tracking and determining the suspicious Internet Protocol address to be an attacker Internet Protocol address according to a number of times the suspicious Internet Protocol address consecutively fails to log in the cloud host; and
    adding a first blocking rule to firewall settings of the cloud host, wherein the first blocking rule instructs to block a login operation of the attacker Internet Protocol address during a preset blocking time, the preset blocking time being a first preset blocking time,
    wherein, the method further comprises:
    deleting the first blocking rule from the firewall settings after the preset blocking time elapses so as to unblock login operation of the attacker Internet Protocol address, and adding the attacker Internet Protocol address to a watch list.

2. The method of claim 1, wherein the method further comprises:
    setting a threshold for the number of times the suspicious Internet Protocol address consecutively fails to log in the cloud host; and
    wherein determining the suspicious Internet Protocol address to be an attacker Internet Protocol address according to the number of times the suspicious Internet Protocol address consecutively fails to log in the cloud host comprises:
    determining the suspicious Internet Protocol address to be an attacker Internet Protocol address if the number of times the suspicious Internet Protocol address consecutively fails to log in the cloud host exceeds the threshold.

3. The method of claim 1, wherein the method further comprises:
    tracking an operation of the attacker Internet Protocol address in the watch list through the system logs; and
    in response to the attacker Internet Protocol address in the watch list failing to log in the cloud host again, adding a second blocking rule to the firewall settings, wherein the second blocking rule instructs to block the login operation of the attacker Internet Protocol address during a second preset blocking time as the preset blocking time.

4. The method of claim 3, wherein the second preset blocking time is twice the first preset blocking time or more.

5. The method of claim 3, wherein the method further comprises:
sending an alarm signal to the cloud, in response to the attacker Internet Protocol address in the watch list logging in the cloud host successfully.

6. An anti-cracking system for a cloud host which is implemented by the cloud host, the system comprising:
one or more processors; and
a storage device configured to store one or more programs, wherein the one or more programs, when executed by the one or more processors, cause the one or more processors to:
determine an Internet Protocol address which fails to log in the cloud host according to system logs of the cloud host as a suspicious Internet Protocol address;
track and determine the suspicious Internet Protocol address to be an attacker Internet Protocol address according to a number of times the suspicious Internet Protocol address consecutively fails to log in the cloud host; and
add a first blocking rule to firewall settings of the cloud host, wherein the first blocking rule instructs to block a login operation of the attacker Internet Protocol address during a preset blocking time, the preset blocking time being a first preset blocking time,
wherein the one or more programs, when executed by the one or more processors, enable the one or more processors further to:
delete the first blocking rule from the firewall settings after the preset blocking time elapses so as to unblock the login operation of the attacker Internet Protocol address, and adding the attacker Internet Protocol address to a watch list.

7. The system of claim 6, wherein the one or more programs, when executed by the one or more processors, enable the one or more processors further to:
set a threshold for the number of times the suspicious Internet Protocol address consecutively fails to log in the cloud host; and
track and determine the suspicious Internet Protocol address to be an attacker Internet Protocol address if the number of times the suspicious Internet Protocol address consecutively fails to log in the cloud host exceeds the threshold.

8. The system of claim 6, wherein the one or more programs, when executed by the one or more processors, enable the one or more processors further to:
track an operation of the attacker Internet Protocol address in the watch list through the system logs; and
in response to the attacker Internet Protocol address in the watch list failing to log in the cloud host again, add a second blocking rule to the firewall settings; wherein the second blocking rule instructs to block the login operation of the attacker Internet Protocol address during a second preset blocking time as the preset blocking time.

9. The system of claim 8, wherein the second preset blocking time is twice the first preset blocking time or more.

10. The system of claim 8, wherein the one or more programs, when executed by the one or more processors, enable the one or more processors further to:
send an alarm signal to the cloud, in response to the attacker Internet Protocol address in the watch list logging in the cloud host successfully.

11. A non-transitory computer readable storage medium, in which a computer program is stored, wherein the program, when executed by a processor, causes the processor to implement the method of claim 1.

12. The non-transitory computer readable storage medium according to claim 11, wherein the program, when executed by the processor, causes the processor to:
set a threshold for the number of times the suspicious Internet Protocol address consecutively fails to log in the cloud host; and
track and determine the suspicious Internet Protocol address to be an attacker Internet Protocol address if the number of times the suspicious Internet Protocol address consecutively fails to log in the cloud host exceeds the threshold.

13. The non-transitory computer readable storage medium according to claim 11, wherein the program, when executed by the processor, causes the processor to:
track an operation of the attacker Internet Protocol address in the watch list through the system logs; and
in response to the attacker Internet Protocol address in the watch list failing to log in the cloud host again, add a second blocking rule to the firewall settings; wherein the second blocking rule instructs to block the login operation of the attacker Internet Protocol address during a second preset blocking time as the preset blocking time.

14. The non-transitory computer readable storage medium according to claim 13, wherein the second preset blocking time is twice the first preset blocking time or more.

15. The non-transitory computer readable storage medium according to claim 13, wherein the program, when executed by the processor, causes the processor to:
send an alarm signal to the cloud, in response to the attacker Internet Protocol address in the watch list logging in the cloud host successfully.

* * * * *